United States Patent [19]

Gebhardt et al.

[11] 4,013,146
[45] Mar. 22, 1977

[54] DISC BRAKE COOLING STRUCTURE

[75] Inventors: Hans Gebhardt; Franz Prahl, both of Munich, Germany

[73] Assignee: Knorr-Bremse GmbH, Munich, Germany

[22] Filed: Dec. 5, 1975

[21] Appl. No.: 638,064

[30] Foreign Application Priority Data

Dec. 18, 1974 Germany .................. 2459859

[52] U.S. Cl. .................. 188/71.6; 188/264 A; 192/70.12; 301/6 CS

[51] Int. Cl.[2] ..................... F16D 65/84

[58] Field of Search ......... 188/71.6, 73.2, 218 XL, 188/264 A, 264 AA; 192/20.12, 113 A; 416/140, 185, 186 A, 188; 295/1; 301/6 CS, 6 E

[56] References Cited

UNITED STATES PATENTS

| 13,244 | 7/1855 | Elgar | 416/140 X |
|---|---|---|---|
| 2,233,594 | 3/1941 | Eksergian | 188/218 XL |
| 2,261,463 | 11/1941 | Garve | 416/188 |
| 2,451,709 | 10/1948 | Baselt | 188/218 XL X |
| 2,463,976 | 3/1949 | Kilchenmann | 416/188 |
| 2,469,458 | 5/1949 | Dunnells et al. | 416/188 |
| 3,314,509 | 4/1967 | Pelikan | 188/264 A X |
| 3,444,966 | 5/1969 | Braukhoff | 188/71.6 X |

FOREIGN PATENTS OR APPLICATIONS 21,124 12/1956 Germany .................. 416/186 A Primary Examiner—George E. A. Halvosa
Attorney, Agent, or Firm—Edmund M. Jaskiewicz

[57] ABSTRACT

A brake disc for railway vehicle disc brakes that can be operated in both directions of rotation has a friction ring traversed by radial cooling ducts formed by a plurality of ribs. A radial impeller is mounted in the space radially inwardly of the friction ring and the impeller has an axial intake and a radial outlet directed toward the cooling air ducts. A plurality of radially oriented blades are provided on the impeller between the intake and outlet.

4 Claims, 5 Drawing Figures

DISC BRAKE COOLING STRUCTURE

The present invention relates to a brake disc for railway vehicle disc brakes, more particularly, for such disc brakes which are operable in both directions of rotation and in which a friction ring is traversed by radially extending cooling air ducts.

It has been known to construct brake discs for railway vehicle disc brakes that are operable in both directions of operation. Such brake discs generally included cooling air ducts extending radially from the hub of the disc between two axially spaced friction rings and then opening at the outer periphery of the disc. The numerous cooling air ducts are supplied with air induced by the rotation of the disc.

The braking effect produced by a brake disc during a braking operation for reducing the speed of a moving vehicle cannot exceed a certain value which is determined by the limit to which the brake disc can be heated. Therefore, any increase in the braking power which can be obtained from a brake disc is largely dependent upon increased dissipation of heat from the brake disc together with other factors. Generally, if the dissipation of heat generated in the brake disc can be improved the brake disc is capable of absorbing higher braking forces without exceeding the temperature limits. Increases in the absorption of braking forces in disc brake systems are becoming more common since railway vehicles are travelling at higher speeds and braking operations may be repeated at relatively short intervals of time.

It is therefore the principal object of the present invention to provide a brake disc having improved heat dissipating characteristics.

It is another object of the present invention to provide a brake disc having an increased flow of cooling air therethrough without increasing the size of the disc while maintaining a relatively simple structure.

It is a further object of the present invention to provide such a brake disc having an increased flow of cooling air therethrough to increase the dissipation of heat generated during the braking operation while at the same time having a relatively simple and inexpensive construction.

According to one aspect of the present invention a brake disc for a railway vehicle disc brake operable in both directions of rotation may comprise a friction ring having a plurality of radial ribs to define a plurality of radial cooling air ducts. A radial impeller is positioned radially inwardly of the ring and has an axially directed intake and a radially directed outlet into the ducts. The impeller is further provided with a plurality of radially oriented blades to direct the flow of cooling air into the radial ducts.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
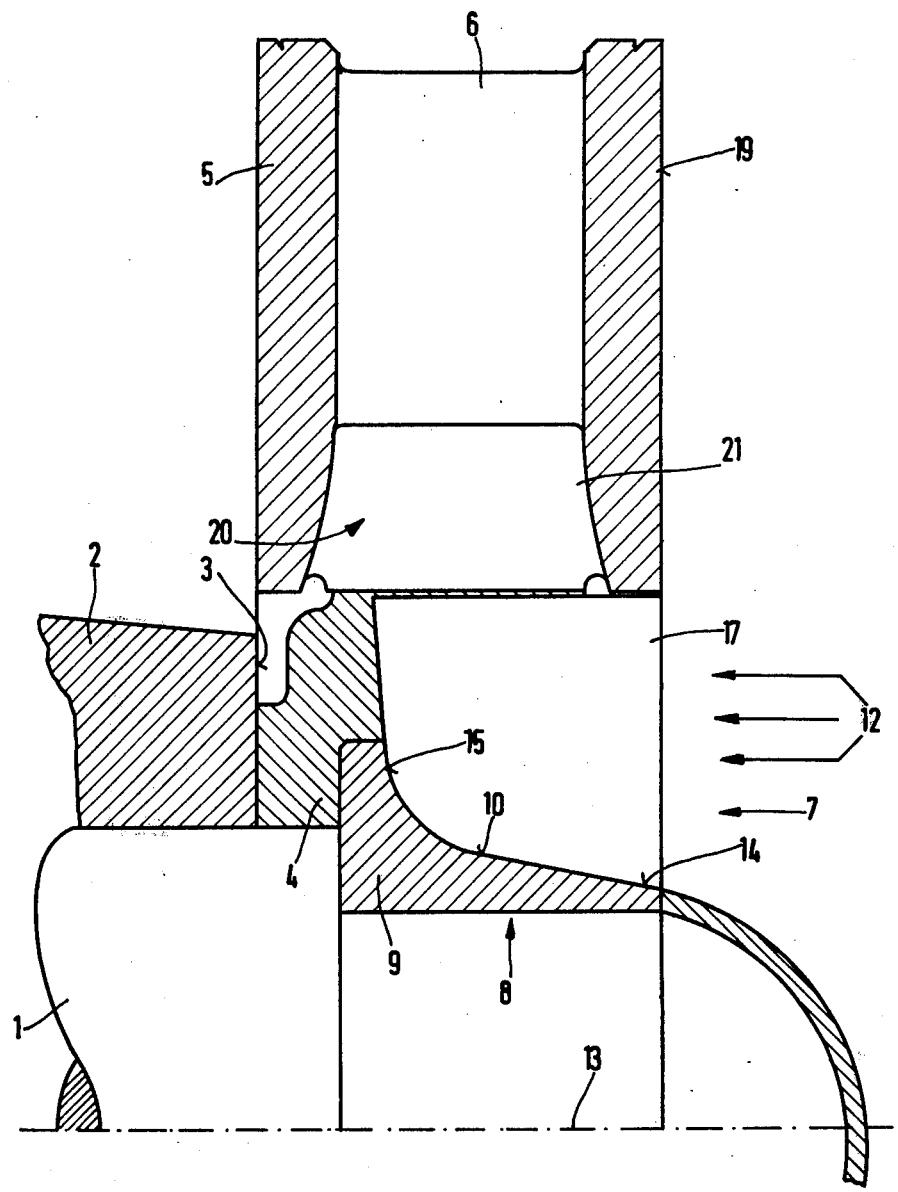
FIG. 1 is an axial sectional view of a half of a brake disc according to the present invention and attached laterally to a wheel.
Figure 2:
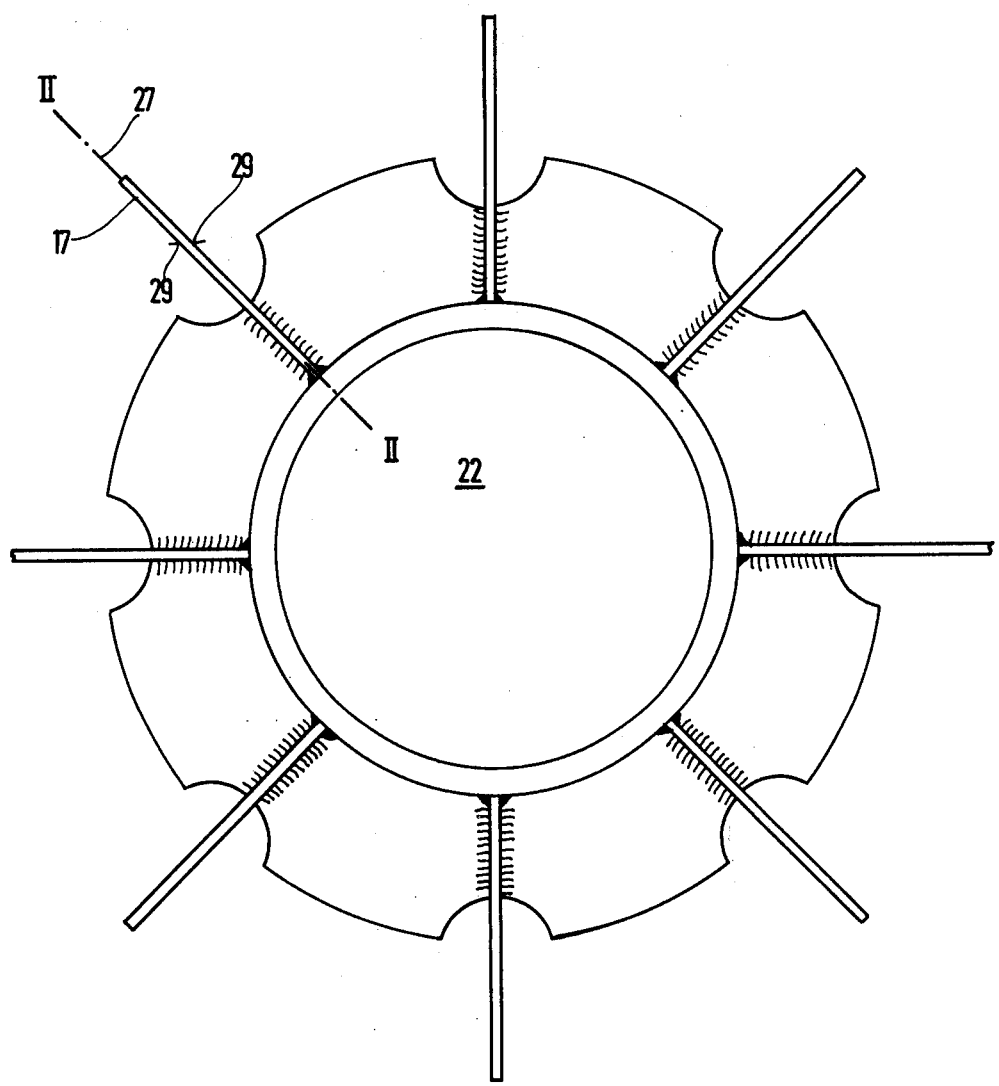
FIG. 2 is a plan view of the inner portion of the brake disc of FIG. 1.

As may be seen in FIG. 1, there is an axle 1 upon which is mounted in the conventional manner a hub 2 of a railway vehicle wheel that is not shown in the drawing. A brake disc supporting ring 4 is mounted on the outwardly directed end face 3 of the hub and mounted on the supporting ring is a friction ring 5 comprising a pair of spaced annular friction members interconnected by a plurality of radially extending ventilating ribs to form a plurality of radial cooling air ducts 6. On the outer surfaces of the annular friction members are friction surfaces which are engaged by brake shoes in a known manner to produce the braking effect.

Within the brake disc supporting ring 9 and at the end of the axle 1 there is defined an inner hub space 7 within which a radial impeller 8 is countersunk into a peripheral edge portion of the space 7.

Figure 3:
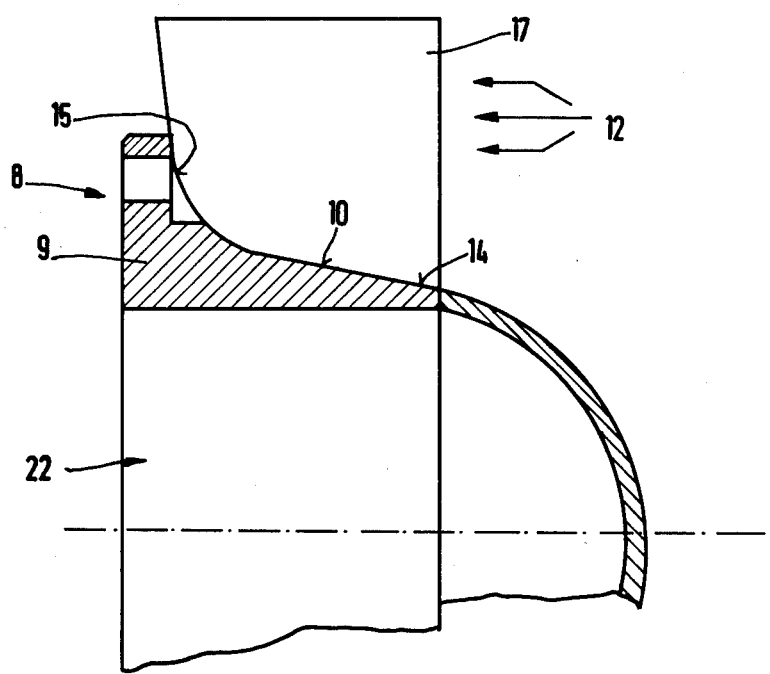
FIG. 3 is a sectional view taken along the line III—III of FIG. 2.

The impeller 8 as can be seen in FIG. 3 comprises a supporting ring 9 provided with an outer generated surface or shell having a concave curvature when viewed in a radial section. The impeller 8 has an axially directed intake 12 and at the intake the generated surface 10 has a portion 14 that is substantially parallel to the axis of rotation of the wheel indicated at 13. On the side of the impeller away from the intake and which is the outlet of the impeller the generated surface 10 has a portion 15 that is substantially radially outwardly directed. The surface portions 14 and 15 have a smooth transition surface therebetween so as to prevent a turbulent flow of air over the generated surface 10 and to bring about as much as possible a streamlined flow of air from the intake to the outlet of the impeller. A plurality of radially extending blades 17 are uniformly arranged on the supporting ring 9 and are attached to the ring 9 in a suitable manner such as by welding.

The edges of the blades 17 at the intake 12 of the impeller extend in a radial direction at the maximum up to a friction surface 19 on the friction ring 5 which is away from the wheel of the vehicle. The edges of the blades 17 on the outlet of the impeller indicated at the space 20 are positioned directly in flow of the radial intake openings 21 of the cooling air ducts 6. The edges of the blades directed toward the hub are limited by the requirements of structure and assembly.

Figure 4:
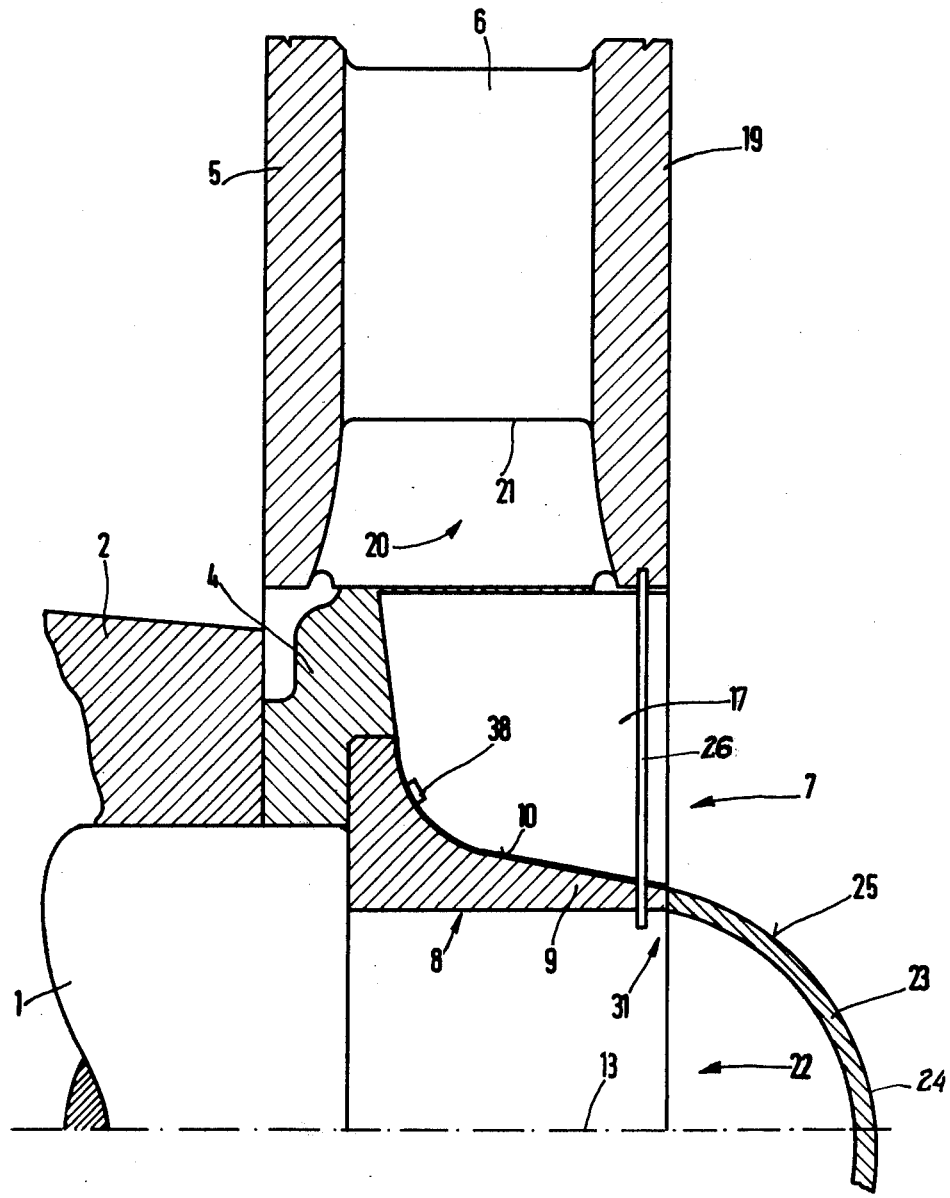
FIG. 4 is a view similar to that of FIG. 1 but showing a modification wherein the blades are pivotable; and, FIG. 5 is a view of a portion of FIG. 4 and showing a further modification for the mounting of pivotable blades.

A space 22 in the center of the impeller and enclosed by the supporting ring 9 is covered by a cap 23 having a convex curved outer section as may be seen in FIG. 4 in order to produce favorable conditions of flow of air into the intake of the impeller. The outer surface of the cap 23 as indicated at 24 conforms smoothly to the generated surface 10 of the supporting ring 9 so as to induce favorable flow conditions over the surface 25 onto the generated surface 10 of the supporting ring 9.

While the radial impeller 8 as described above is constructed in a form of a separate detachable component the impeller may also be constructed in accordance with the invention by forming the blades 17 and generated surface 10 directly on portions of the brake disc supporting ring 9 or on portions in the inner area of the friction ring 5.

Since it is desirable that the brake disc is operable in both directions of rotation without any differences in the flow of air to the brake disc that might be caused by the direction of rotation, the blades 17 are generally not set at an angle with respect to a particular direction of rotation. However, in accordance with the present invention the impeller blades 17 may be provided on each side thereof with a surface that is fully symmetrical to axial central planes 27 passing respectively through the blades. Each surface may thus be provided with a particular setting angle. With respect to the axial central plane 27 of a blade 17, both surfaces of the blade may be provided with a surface 29 that is linear or non-linear and/or may have a radial, inside-outside variable curvature. When viewed in the axial direction, the surfaces 29 of both sides of a blade 17 may form an angle that diverges toward the intake 12 such that each blade surface 29 in effect is set at an angle to facilitate flow of air through the impeller.

The present invention further provides that the impeller blades 17 may be so mounted so as to have a setting angle which is favorable for a particular direction of rotation of the brake disc. As may be seen in FIG. 4, the inner edges of the blade 17 are not fixed upon the generated surface 10 of the supporting ring 9 but may be pivotally mounted upon a pin 26 which extends radially with respect to the impeller and is mounted adjacent the intake thereof. The blades 17 are thus free to pivot a few degrees in either direction from the radial and the range of pivoting is limited by stops or buttons 38 formed on both sides of each blade on the supporting ring 9.

Because of the relatively loose mounting of the impeller blades 17 the flow of air through the impeller caused by the rotation of the brake disc will set the blades at an angle so as to exert a favorable effect on the quantity of air drawn into the intake of the impeller.

Figure 5:
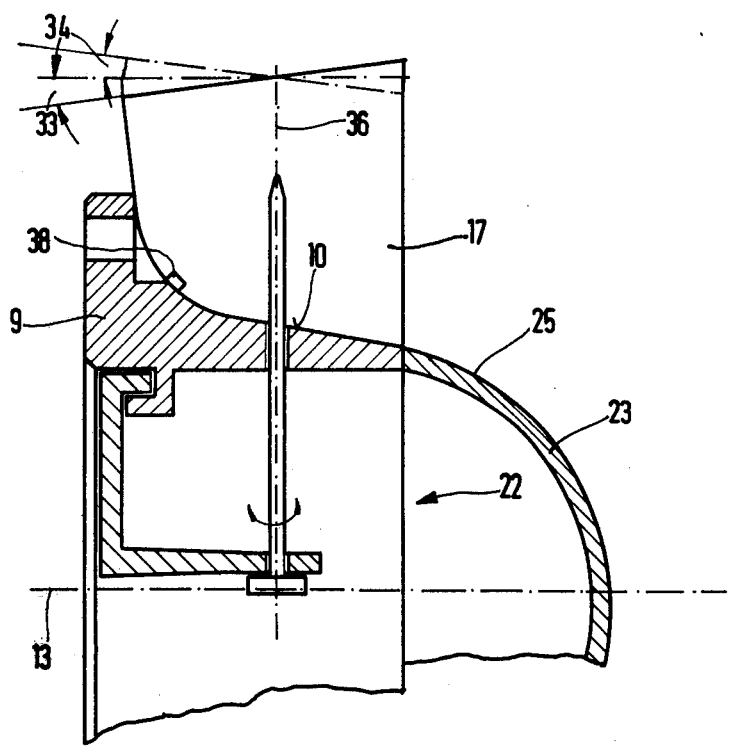

In FIG. 5, each blade 17 is mounted for pivotable action about a radially extending axis 36 which is shifted inwardly away from the intake 12 of the impeller toward the center of gravity of a blade. The pin 36 penetrates through the supporting ring 9 and has its inner end retained in an annular bracket secured within the interior of the supporting ring.

As the air flows through the impeller as shown in FIG. 5 the flow of air on the blade surfaces 29 because of the rotation of the brake disc will automatically set a tilting angle 33 or 34 as also indicated in FIG. 5. The angles which are limited to several degrees are defined by stops 38.

Tilting or pivoting of the blade 17 may also be obtained by providing a drag plate that reacts to both directions of rotation of the brake disc.

Thus it can be seen that the present invention has provided a brake disc which is operable in both directions of rotation and which has improved properties for the dissipation of heat obtained by increasing the flow of cooling air therethrough. The flow of air is induced by a radial impeller mounted radially inwardly of the friction ring and the impeller has a radially inwardly positioned axial direction of intake and a radially oriented outlet which is directed toward cooling air duct formed in the brake discs. The impeller is further provided with radially positioned blades which may be moveably mounted in order to adapt automatically to setting angles conducive to increasing the flow of air through the brake discs in accordance with the direction of rotation of the brake disc.

It will be understood that this invention is susceptible to modification in order to adapt it to different usages and conditions, and accordingly, it is desired to comprehend such modifications within this invention as may fall within the scope of appended claims.

What is claimed is:

1. A brake disc for a railway vehicle disc brake operable in both directions of rotation and comprising a friction ring mounted on the end of a wheel hub to define an open space radially inwardly of said friction ring, a plurality of radial ribs attached to said friction ring to define cooling air ducts, a radial impeller disposed radially inwardly of said friction ring within the peripheral edge portion of said open space, said impeller having an axially directed intake and a radially directed outlet into said ducts and comprising a supporting ring having a substantially axially extending flow surface, radially oriented blades having radial inner edges positioned upon said supporting ring flow surface, said blades projecting axially in the direction of the intake of said impeller toward a friction surface on the side of said friction ring away from said wheel hub, the edges of said blades in the outlet direction extending in front of said radial air ducts, said supporting ring flow surface having a concave curved configuration with the portion of said curved surface at said intake being substantially axial and the portion of said curved surface at said outlet being substantially radial, and a cap having an outer convex curved surface and an end mounted over the opening enclosed by said supporting ring, the outer surface of said cap having a smooth transition to the axial intake portion of said curved surface of said supporting ring flow surface.

2. A brake disc as claimed in claim 1 and a means on said friction ring for defining a flow surface between said impeller intake and outlet, said blades being mounted on said friction ring.

3. A brake disc as claimed in claim 1 and means on said brake disc for defining a flow surface between said impeller intake and outlet, said blades being mounted on said brake disc.

4. A brake disc as claimed in claim 1 wherein said blades are each pivotally mounted on said supporting ring for pivotal movement on a radially extending axis.

* * * * *